May 24, 1927.
D. L. WOLF
1,629,566
MOTOR VEHICLE POWER ATTACHMENT
Filed Jan. 27, 1927
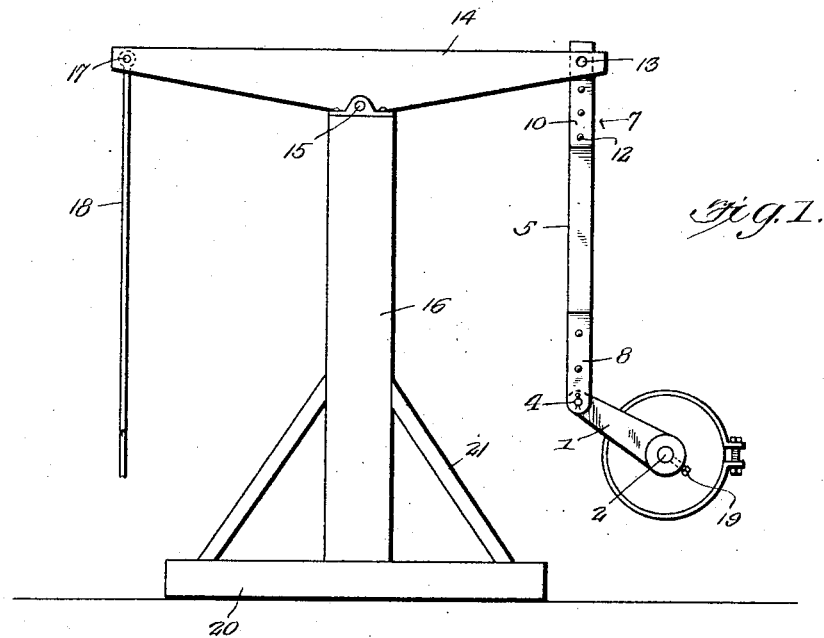
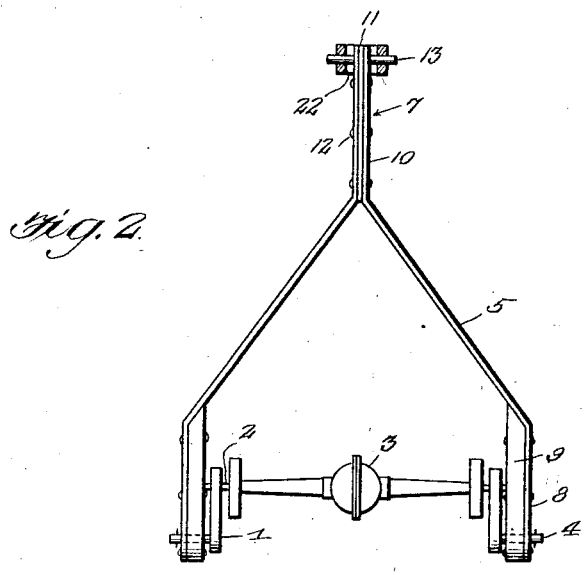
INVENTOR.
D. L. Wolf,
BY
ATTORNEY.

Patented May 24, 1927.

1,629,566

UNITED STATES PATENT OFFICE.

DAVIS LEVI WOLF, OF OLNEY, TEXAS.

MOTOR-VEHICLE POWER ATTACHMENT.

Application filed January 27, 1927. Serial No. 164,100.

The invention relates to a power attachment for tractor and other motor vehicles.

The object of the present invention is to provide a simple, practical and efficient motor vehicle power drive of strong, durable and comparatively inexpensive construction, adapted to eliminate the wear on the differential of the driving axle of a motor vehicle, which wear occurs when power is taken from one end of the rear axle at one side of the differential and the other end is held stationary.

A further object of the invention is to provide a motor vehicle power drive of this character adapted to be connected to both ends of the rear axle of a tractor or other motor vehicle, whereby when power is applied both sections of the rear axle will revolve in unison and produce a uniform distribution of power and drive without wear on the differential.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings,

Figure 1 is a side elevation of a motor vehicle power drive constructed in accordance with this invention and shown applied to a pump rod and walking beam for operating a pump.

Fig. 2 is an end elevation of the same.

In the accompanying drawing, in which is illustrated the preferred embodiment of the invention, the motor vehicle power drive comprises in its construction a pair of cranks 1 which are suitably secured to the outer ends of the sections 2 of the rear axle of tractor or other motor vehicle at opposite sides of the differential 3. The cranks 1 may be secured to the outer ends of the rear axle sections in any desired manner, and they are provided with wrist pins 4 to which are connected the sides 5 of a connecting fork which is composed of the said sides 5 and the straight central portion 7. The sides of the fork are provided with parallel lower portions 8 and converging upper portions, the parallel lower portions being preferably provided at their inner faces with reinforcing members 9 suitably secured to the sides of the fork, as clearly illustrated in Fig. 2 of the drawing. The sides of the fork are preferably formed by metal bars which are annularly bent to form the upwardly converging portions and the lower parallel portions, and the upper portions 10 of the side bars are bent into parallelism and secured to the opposite faces of a straight central section 11 by suitable fastening devices 12. The straight central upper arm or portion of the fork is provided with a transverse pivot 13 which connects the upper end of the fork with one arm of a walking beam 14 fulcrumed at its center at 15 upon the upper end of a post or support 16. The other arm of the walking beam is pivotally connected at 17 to the upper end of a reciprocating pump rod 18. When the power is applied and the rear axle is rotated the fork will be reciprocated and will transmit its reciprocating motion to the pump rod through the oscillating walking beam. The crank 1 is shown in Fig. 1 of the drawing attached to the rear axle by a clamping screw 19, but any other suitable means may be employed.

When the rear axle is rotated the distribution of the power will be uniform, and a uniform drive will be afforded without the wear which is incident to taking power from one end of the rear axle while the other end is held stationary.

While the power drive is shown applied to a reciprocating pump rod, an oil well drill or any other similar mechanism may be operated, as will be readily understood.

The post or support is shown mounted upon the base 20 and is supported in an upright position by opposite inclined braces 21, but any other suitable framework or support may be provided for the walking beam or other power transmitting means. The walking beam is preferably bifurcated at 22 to receive the upper end of the fork.

What I claim is:

1. In a motor vehicle drive, the combination with a rear axle having a differential, of crank elements secured to the ends of the rear axle at opposite sides of the differential, and a connecting fork having spaced sides pivotally connected to the crank elements and adapted to cause the drive through the rear axle to be uniform when power is applied to the rear axle.

2. In a motor vehicle drive, the combination with a rear axle having a differential, of cranks secured to the rear axle at opposite ends of the differential and provided with wrist pins, and a connecting fork having spaced sides provided with parallel lower portions having reinforcing members and mounted on the wrist pins.

3. In a motor vehicle drive, the combination with a rear axle having a differential, of cranks secured to the rear axle at opposite ends of the differential and provided with wrist pins, and a connecting fork having spaced sides provided with parallel lower portions having reinforcing members and mounted on the wrist pins, said fork being composed of bars annularly bent at the upper ends of the said parallel portions and converging upwardly and provided with straight parallel upper portions, a straight section secured between the parallel upper portions of the said bars, and a transverse pivot carried by the upper end of the fork.

In testimony whereof I have hereunto set my hand.

DAVIS L. WOLF.